United States Patent [19]

Ishida

[11] 4,241,704
[45] Dec. 30, 1980

[54] INTAKE SYSTEM OF AN INTERNAL COMBUSTION ENGINE

[75] Inventor: Yasuhiko Ishida, Mishima, Japan

[73] Assignee: Toyota Jidosha Kogyo Kabushiki Kaisha, Toyota, Japan

[21] Appl. No.: 33,517

[22] Filed: Apr. 26, 1979

[30] Foreign Application Priority Data

Jun. 15, 1978 [JP] Japan .................................. 53-71536

[51] Int. Cl.³ ........................ F02M 23/02; F02B 31/00
[52] U.S. Cl. .................................. 123/432; 261/41 D; 261/65; 123/585
[58] Field of Search .......... 123/75 B, 119 D, 119 DB, 123/124 R, 97 B, 30 C; 261/65, 41 D

[56] References Cited

U.S. PATENT DOCUMENTS

| 2,062,260 | 11/1936 | Weber | 123/97 B |
| 3,359,958 | 12/1967 | Von Seggern et al. | 123/75 B |
| 3,363,886 | 1/1968 | Walker | 261/41 D |
| 3,410,539 | 11/1968 | Walker | 261/65 X |
| 4,112,877 | 9/1978 | Goto et al. | 123/75 B X |

FOREIGN PATENT DOCUMENTS 433083 8/1926 Fed. Rep. of Germany ............. 261/65
701555 3/1931 France .............................. 123/119 DB Primary Examiner—Tony M. Argenbright
Attorney, Agent, or Firm—Kenyon & Kenyon

[57] ABSTRACT

An internal combustion engine comprising a carburetor having a throttle valve arranged in the main intake passage. The throttle valve comprises a rigid valve body of a circular shape and at least one deformable valve plate of a semielliptical shape. The inner end of the valve plate is fixed onto the rear face of the valve body so that the peripheral outer edge of the valve plate projects outwardly from the peripheral outer edge of the valve body. When the opening degree of the throttle valve becomes small, the valve plate comes into engagement with the inner wall of the main intake passage and is bent to form a valve space between the valve body and the valve plate. An auxiliary intake passage is additionally provided. The inlet of the auxiliary intake passage is so arranged that it opens into the valve space which is formed when the opening degree of the throttle valve becomes small. The outlet of the auxiliary intake passage is connected to the main intake passage located downstream of the throttle valve at a position near the intake valve.

11 Claims, 7 Drawing Figures

INTAKE SYSTEM OF AN INTERNAL COMBUSTION ENGINE

DESCRIPTION OF THE INVENTION

The present invention relates to an intake system of a multi-cylinder internal combustion engine.

Particularly in a gasoline engine, in order to obtain a high output power of the engine by increasing the volumetric efficiency when the engine is operating at a high speed under a heavy load, the shape of an intake port is so constructed that the intake port has as small a flow resistance as possible. In the case wherein the intake port has such a shape, since a considerably strong turbulence is spontaneously created in the combustion chamber of the engine when the engine is operating at a high speed under a heavy load, the burning velocity is sufficiently increased. However, when the same engine is operating at a low speed, a satisfactory strong turbulence is not created in the combustion chamber, thus resulting in a problem in that a sufficient increase in the burning velocity is not obtained.

As a method of creating a strong turbulence in the combustion chamber when an engine is operating at a low speed, there is a method of compulsorily creating a swirl motion in the combustion chamber by using a helically-shaped intake port or by using a shroud valve. However, in the case wherein such a method is adopted, since the flow resistance to which the mixture fed into the cylinder is subjected is increased, a problem occurs in that the volumetric efficiency is reduced when an engine is operating at a high speed under a heavy load. Consequently, in order to increase the burning velocity when an engine is operating at a low speed while ensuring a high volumetric efficiency when an engine is operating at a high speed under a heavy load, it is necessary to form an intake port so that it has as small a flow resistance as possible and, at the same time, to create a strong turbulence in the combustion chamber when an engine is operating at a low speed.

In addition, as a method of improving a combustion when an engine is operating at a low speed under a light load, there is a method of promoting the vaporization of fuel, in addition to a method of creating a strong turbulence in the combustion chamber. That is, when an engine is operating at a low speed under a light load, the velocity of air flowing in the venturi of the carburetor is low. Consequently, since the relative speed between the fuel fed from the fuel nozzle and the air flowing in the venturi is small, it is impossible to fully divide the liquid fuel into fine particles. As a result of this, a large amount of the fuel is fed into the cylinder in the form of liquid fuel and a problem is thus caused in that a good combustion cannot be obtained.

In order to prevent the above-mentioned problems from occurring, an engine has been proposed, in which an intake passage comprises a main intake passage having a relatively large cross-sectional area and an auxiliary intake passage having a relatively small cross-sectional area. An auxiliary throttle valve is arranged in the main intake passage at a position located downstream of the throttle valve of the carburetor. On one hand, the inlet of the auxiliary intake passage is connected to the main intake passage located between the auxiliary throttle valve and the throttle valve of the carburetor. On the other hand, the outlet of the auxiliary intake passage is connected to the main intake passage located near the intake valve and downstream of the auxiliary throttle valve. In this engine, when the engine is operating under a light load, since the auxiliary throttle valve is closed, the mixture is fed into the combustion chamber via the auxiliary intake passage. At this time, since the auxiliary intake passage has a relatively small cross-sectional area, the mixture flows within the auxiliary intake passage at a high speed. As a result of this, the vaporization of fuel is promoted in the auxiliary intake passage; in addition, a turbulence or a swirl motion is caused in the combustion chamber by the mixture spouted from the auxiliary intake passage. When the engien is operating under a heavy load, since the auxiliary throttle valve is fully opened, the mixture is fed into the combustion chamber via the main intake passage having a small flow resistance. As a result of this, a high volumetric efficiency can be ensured. However, in this engine, since it is necessary that the engine be provided with an auxiliary throttle valve in addition to the throttle valve of the carburetor and also be provided with a device for actuating the auxiliary throttle valve, a problem occurs in that the construction of the engine becomes complicated and, in addition, the manufacturing cost of the engine is increased.

An object of the present invention is to provide an internal combustion engine capable of promoting the vaporization of fuel and capable of creating a strong swirl motion or a strong turbulence in the combustion chamber when an engine is operating under a light load, while ensuring a high volumetric efficiency when the engine is operating at a high speed under a heavy load by merely effecting a slight change to the construction of throttle valve of the carburetor.

According to the present invention, there is provided an internal combustion engine having a combustion chamber and an intake valve, the engine comprising: a main intake passage having an inlet and connected to the combustion chamber via the intake valve; fuel supply means arranged in the inlet of the main intake passage and having a rotatable valve shaft and a valve body which is fixed onto the valve shaft and which has a front face and a rear face, the valve body having a shape which is approximately equal to that of the cross-section of the main intake passage; a deformable valve plate comprising an inner end fixed onto the rear face of the valve body, and a peripheral outer edge normally projecting outwardly from a peripheral outer edge of the valve body and having a contour capable of establishing the sealing contact between the peripheral outer edge of the valve plate and an inner wall of the main intake passage when the opening degree of the valve body is reduced below a predetermined degree, the valve plate being arranged to be normally in contact with the rear face of the valve body and being bent to form a valve space between the valve body and the valve plate when the opening degree of the valve body is reduced below the predetermined degree; and an auxiliary intake passage having an outlet and an inlet arranged in the vicinity of the valve body at a position wherein the inlet is normally in communication with the main intake passage located upstream of the valve body and also in communication with the valve space when the opening degree of the valve body is reduced below the predetermined degree, the outlet of the auxiliary intake passage being connected to the main intake passage located downstream of the valve body.

The present invention may be more fully understood from the description of preferred embodiments of the

DESCRIPTION OF PREFERRED EMBODIMENTS

Figure 1:
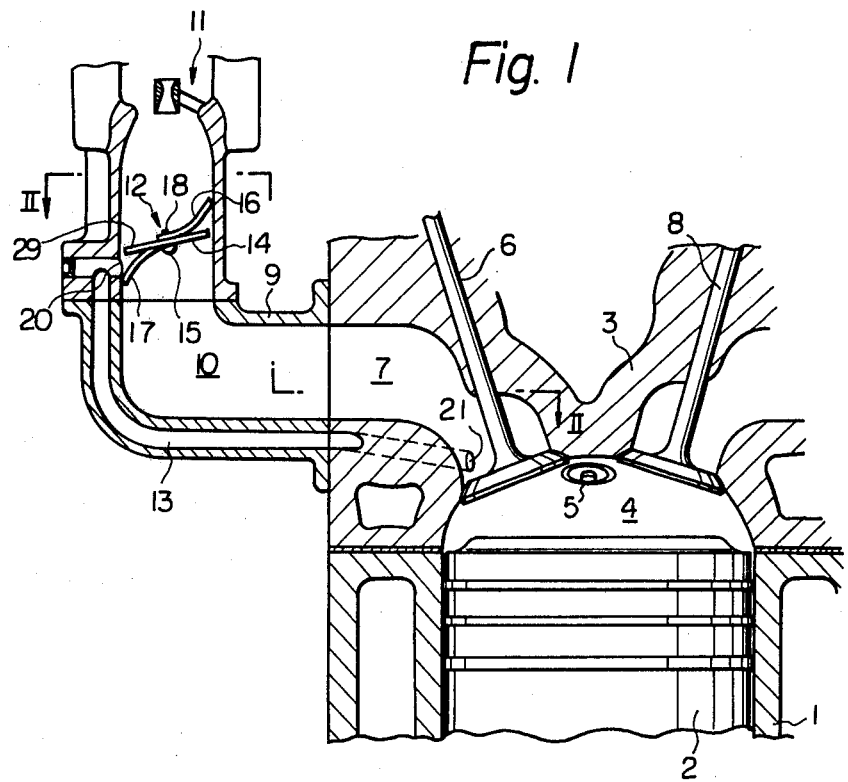
FIG. 1 is a cross-sectional side view of an embodiment of an internal combustion engine according to the present invention.
Figure 2:
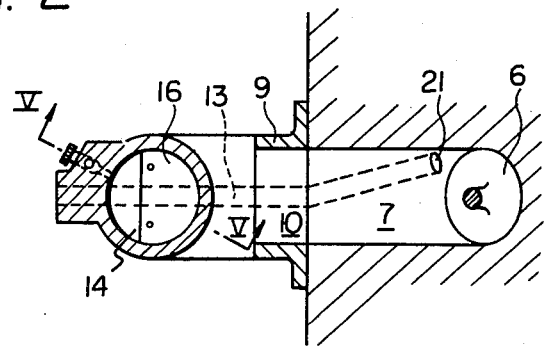
FIG. 2 is a cross-sectional view taken along the line II—II in FIG. 1.
Figure 4:
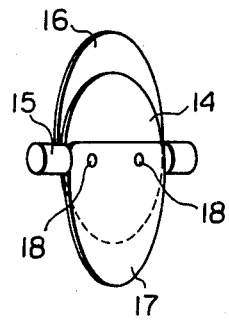
FIG. 4 is a perspective view of the throttle valve illustrated in FIG. 1.

Referring to FIG. 1, reference numeral 1 designates a cylinder block, 2 a piston reciprocally movable in the cylinder block 1, 3 a cylinder head fixed onto the cylinder block 1, and 4 a combustion chamber formed between the top face of the piston 2 and the inner wall of the cylinder head 3; 5 designates a spark plug, 6 an intake valve, 7 an intake port formed in the cylinder head 3; 8 designates an exhaust valve, 9 an intake pipe, 10 an intake passage, 11 a carburetor, 12 a throttle valve of the carburetor 11; and 13 designates an auxiliary intake passage having a cross-sectional area which is much smaller than that of the intake passage 10. The throttle valve 12 comprises a substantially circular valve body 14 made of a rigid material, and the valve body 14 is fixed onto a rotatable valve shaft 15, which is arranged so as to extend horizontally across the intake passage 10, at the symmetrical axis of the valve body 14. As is illustrated in FIGS. 1 and 4, deformable valve plates 16 and 17 made of a thin metal plate or rubber plate are arranged on the front face and the rear face of the valve body 14, respectively, and fixed onto the valve shaft 15 together with the valve body 14 by means of a pair of small screws 18. As is illustrated in FIG. 4, the contour of the valve plates 16, 17 forms a portion of an ellipse, and the valve plates 16, 17 are fixed onto the valve shaft 15 at the minor axis of the ellipse. Consequently, the peripheral outer edge of each of the valve plates 16, 17 projects outwardly from the peripheral outer edge of the valve body 14. Therefore, when the throttle valve 12 is positioned at its idling position as illustrated in FIG. 1, the peripheral outer edge of each of the valve plates 16, 17 abuts against the inner wall of the intake passage 10, and the valve plates 16 and 17 are thus bent upwardly and downwardly, respectively. At this time, the peripheral outer edge of each of the valve plates 16, 17 sealingly contacts the inner wall of the intake passage 10. As is illustrated in FIG. 1, since the valve plate 17 is bent downwardly when the throttle valve 12 is positioned at its idling position, a space 19 is formed between the valve body 14 and the valve plate 17. The auxiliary intake passage 13 has on its upper end an inlet 20 arranged in the vicinity of the throttle valve 12 and opening into the intake passage 10, and the inlet 20 is so arranged that it opens into the space 19 formed between the valve body 14 and the valve plate 17. As is illustrated in FIGS. 1 and 2, an outlet 21 of the auxiliary intake passage 13 opens into the intake port 7 in the vicinity of the intake valve 6 and is so arranged that the outlet 21 is directed towards a valve gap formed between the intake valve 6 and its valve seat when the intake valve 6 is opened.

In operation, at the time of idling, since the peripheral outer edge of each of the valve plates 16, 17 sealingly contacts the inner wall of the intake passage 10 as mentioned above, the mixture formed in the carburetor 11 passes through a gap between the valve body 14 and the inner wall of the intake passage 10 and then flows into the auxiliary intake passage 13 from the inlet 20. As is illustrated in FIGS. 1 and 2, since the auxiliary intake passage 13 has an extremely small cross-section, the mixture flows within the auxiliary intake passage 13 at a high speed. As a result, the vaporization of the liquid fuel contained in the mixture is promoted in the auxiliary intake passage 13. Then, the mixture spouted from the auxiliary intake passage 13 flows into the combustion chamber 4 at a high speed via the valve gap formed between the intake valve 6 and its valve seat and causes a strong turbulence or a strong swirl motion in the combustion chamber 4. As a result of this, a burning velocity is considerably increased.

Figure 3:
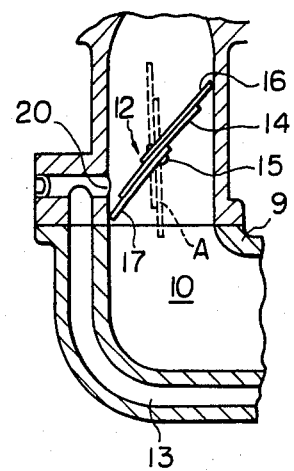
FIG. 3 is a cross-sectional side view of a part of the engine illustrated in FIG. 1, showing the case wherein the throttle valve is opened by some extent.

When the throttle valve 12 is opened by a slight extent, the valve plates 16, 17 come into contact with the valve body 14 as illustrated by the solid lines in FIG. 3. However, at this time, since the peripheral outer edge of each of the valve plates 16, 17 remains in sealing contact with the inner wall of the intake passage 10, the mixture flows into the auxiliary intake passage 13 from the inlet 20.

When the throttle valve 12 is opened by a greater extent and the peripheral outer edge of each of the valve plates 16, 17 is thus moved away from the inner wall of the intake passage 10, the mixture begins to flow into the combustion chamber 4 via the intake passage 10. When the throttle valve 12 is fully opened as illustrated by the broken lines A in FIG. 3, a large part of the mixture flows into the combustion chamber 4 via the intake passage 10 having a small flow resistance and, as a result, a high volumetric efficiency can be ensured. As mentioned above, in this embodiment, when the engine is operating under a light load, a strong turbulence and a strong swirl motion can be caused in the combustion chamber 4 and, in addition, the vaporization of fuel can be promoted. On the other hand, when the engine is operating under a heavy load, a high volumetric efficiency can be ensured.

Figure 5:
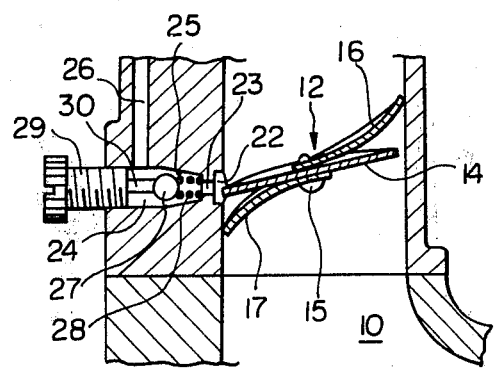
FIG. 5 is a cross-sectional side view taken along the line V—V in FIG. 2.

FIG. 5 illustrates a slow fuel feed system. Referring to FIG. 5, reference numeral 22 designates a shallow groove formed on the inner wall of the intake passage 10; 23 designates a slow fuel port which opens into the groove 22; 24 designates a fuel chamber having a tapered inner wall 25; 26 designates a fuel feed passage connected to the float chamber (not shown), 27 a ball, 28 a compression spring, and 29 an adjustable screw having a projection 30. The slow fuel port 23 is arranged in the vicinity of the throttle valve 12 so that the peripheral outer edge of the valve body 14 faces the slow fuel port 23 when the throttle valve 12 is positioned at its idling position as illustrated in FIG. 5. At this time, an approximately atmospheric pressure acts on the groove 22 located upstream of the vlave body 14, and a vacuum acts on the groove 22 located downstream of the valve body 14. Consequently, it will be understood that the vacuum, the level of which is determined by a ratio of an area of the vacuum acting region within the groove 22 to an area of the atmospheric pressure acting region within the groove 22, acts on the slow fuel port 23. The level of the vacuum acting on the slow fuel port 23 is increased as the opening degree of the throttle valve 12 becomes small. Consequently, as the opening degree of the throttle valve 12 becomes small, the ball 27 moves towards the right direction of FIG. 5 against the spring force of the compression spring 28. As a result of this, the area of the fuel flow passage formed around the ball 27 is reduced, and the amount of fuel fed from the slow fuel port 23 is thus reduced.

Figure 6:
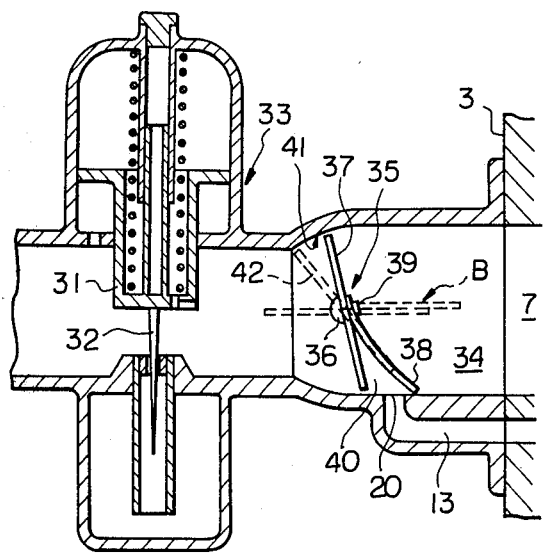
FIG. 6 is a cross-sectional side view of an alternative embodiment according to the present invention.
Figure 7:
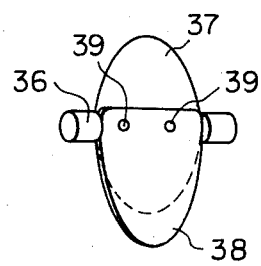
FIG. 7 is a perspective view of the throttle valve illustrated in FIG. 6.

FIG. 6 illustrates an alternative embodiment. In FIG. 6, similar components are indicated with the same reference numerals used in FIG. 1. In this embodiment, instead of using a carburetor as illustrated in FIG. 1, a variable venturi type carburetor 33 comprising a movable suction piston 31 and a movable needle 32 is mounted on the cylinder head 3, and a throttle valve 35 is inserted into an intake passage 34 of the carburetor 33. This throttle valve 35 comprises a rotatable valve shaft 36 and a valve body 37 fixed onto the valve shaft 36. As is illustrated in FIGS. 6 and 7, a deformable valve plate 38 having a semi-elliptical shape is arranged on the rear face of the valve body 37 and fixed onto the valve shaft 36 by means of a pair of small screws 39. In the same manner as described with reference to FIG. 1, when the throttle valve 35 is positioned at its idling position as illustrated in FIG. 6, the valve plate 38 is bent and a space 40 is thus formed between the valve body 37 and the valve plate 38. In addition, the inlet 20 of the auxiliary intake passage 13 is so arranged that it opens into the space 40. On the other hand, as is illustrated in FIG. 6, the diameter of the intake passage 34 is enlarged so that the inner wall of the enlarging portion 41 forms a portion of a sphere which has a radius approximately equal to that of the valve body 37. In this embodiment, during the time the valve body 37 is rotated from the position shown by the solid lines to the position shown by the broken lines 42, since a clearance formed between the inner wall of the enlarging portion 41 and the peripheral upper edge of the valve body 37 is extremely small, the mixture formed in the carburetor 33 flows into the auxiliary intake passage 13 from the inlet 20. When the throtttle valve 35 is opened by a greater extent, the peripheral upper edge of the valve body 37 moves away from the enlarging portion 41. At the same time, the valve plate 38 moves away from the inner wall of the intake passage 34. At this time, the mixture begins to flow into the intake port 7 via the intake passage 34. In the embodiment illustrated in FIG. 6, by forming the enlarging portion 41, it is not necessary that the valve plate 16 as illustrated in FIG. 1 be arranged on the front face of the valve body 14. In the present invention, as is illustrated by the broken lines A and B in FIGS. 3 and 6, respectively, when the throttle valves 12 and 35 are fully opened, the valve plates 16, 17 and 38 come into contact with the valve bodies 14 and 37, the flow resistance to which the mixture stream is subjected becomes extremely small.

According to the present invention, the creation of a strong turbulence in the combustion chamber and the promotion of the vaporization of fuel can be ensured when an engine is operating under a light load while ensuring a high volumetric efficiency when an engine is operating at a high speed under a heavy load by merely attaching the deformable valve plate onto a connectional throttle valve of the carburetor. In addition, since a burning velocity is increased due to the creation of the strong turbulence when an engine is operating under a light load, the smooth rotation of an engine can be ensured even if a relatively lean mixture is used. As a result of this, a specific fuel consumption can be reduced; at the same time, the amount of harmful CO and HC components in the exhaust gas can be reduced. In addition, since the smooth rotation of an engine can be ensured even if a relatively large amount of exhaust gas is recirculated into the intake system of an engine, the amount of harmful $NO_x$ components in the exhaust gas can be reduced.

While the invention has been described with reference to specific embodiments chosen for purposes of illustration, it should be apparent that numerous modifications can be made thereto by those skilled in the art without departing from the spirit and scope of the invention.

What is claimed is:

1. An internal combustion engine having a combustion chamber and an intake valve, said engine comprising:

a main intake passage having an inlet and connected to the combustion chamber via the intake valve;

fuel supply means arranged in the inlet of said main intake passage and having a rotatable valve shaft and a valve body which is fixed onto said valve shaft and has a front face and a rear face, said valve body having a shape which is approximately equal to that of the cross-section of said main intake passage;

a deformable valve plate comprising an inner end fixed onto the rear face of said valve body, and a peripheral outer edge normally projecting outwardly from a peripheral outer edge of said valve body and having a contour capable of establishing the sealing contact between the peripheral outer edge of said valve plate and an inner wall of said main intake passage when the opening degree of said valve body is reduced below a predetermined degree, said valve plate being arranged to be normally in contact with the rear face of said valve body and being bent to form a valve space between said valve body and said valve plate when the opening degree of said valve body is reduced below said predetermined degree; and an auxiliary intake passage having an outlet and an inlet arranged in the vicinity of said valve body at a position wherein said inlet is normally in communication with said main intake passage located upstream of said valve body and is in communication with said valve space when the opening degree of said valve body is reduced below said predetermined degree, the outlet of said auxiliary intake passage being connected to said main intake passage located downstream of said valve body.

2. An internal combustion engine as claimed in claim 1, wherein said valve body has a circular shape and is fixed onto said valve shaft at a symmetrical axis of said valve body, said valve plate having a semielliptical shape and being fixed onto the rear face of said valve body at a minor axis of the ellipse.

3. An internal combustion engine as claimed in claim 1, wherein said valve plate is made of a resilient member such as a thin metal plate and a rubber plate.

4. An internal combustion engine as claimed in claim 1, wherein said engine further comprises another deformable valve plate arranged to be normally in contact with the front face of said valve body, said other valve plate comprising an inner end fixed onto the front face of said valve body, and a peripheral outer edge normally projecting outwardly from the peripheral outer edge of said valve body in a direction opposite to the projecting direction of said valve plate fixed onto the rear face of said valve body, the peripheral outer edge of said other valve plate having a contour capable of establishing the sealing contact between the peripheral outer edge of said other valve plate and the inner wall of said main intake passage when the opening degree of said valve body is reduced below said predetermined degree.

5. An internal combustion engine as claimed in claim 1, wherein the inner wall of said main intake passage has an enlarging wall portion arranged around said valve body at which the cross-section of said main intake passage is enlarged, said enlarging wall portion forming a portion of a sphere which has a radius approximately equal to that of said valve body.

6. An internal combustion engine as claimed in claim 1, wherein said engine further comprises a slow fuel feed device having a slow fuel passage and a slow fuel port which opens into said main intake passage at a position near said valve body, said slow fuel port being arranged to face the peripheral outer edge of said valve body when said valve body is positioned at its idling position.

7. An internal combustion engine as claimed in claim 6, wherein a flow control valve is arranged in said slow fuel passage for reducing the amount of fuel fed from said slow fuel port in accordance with a reduction of the opening degree of said valve body.

8. An internal combustion engine as claimed in claim 6, wherein a shallow groove is formed on the inner wall of said main intake passage at a position around the opening of said slow fuel port.

9. An internal combustion engine as claimed in claim 1, wherein said auxiliary intake passage has a cross-sectional area which is smaller than that of said main intake passage.

10. An internal combustion engine as claimed in claim 1, wherein the outlet of said auxiliary intake passage is arranged in the vicinity of said intake valve.

11. An internal combustion engine as claimed in claim 10, wherein the outlet of said auxiliary intake passage is directed to a valve gap formed between said intake valve and a valve seat thereof when said intake valve is opened.

* * * * *